United States Patent [19]

Wichterle et al.

[11] 4,087,598

[45] May 2, 1978

[54] MERCURATED POLYMERS, METHOD FOR THEIR PREPARATION AND POLYMERS PRODUCED THEREFROM

[75] Inventors: Otto Wichterle; Jiri Coupek; Miroslava Krivakova, all of Prague, Czechoslovakia

[73] Assignee: Ceskoslovenska akademie ved, Prague, Czechoslovakia

[21] Appl. No.: 574,632

[22] Filed: May 5, 1975

Related U.S. Application Data

[63] Continuation-in-part of Ser. No. 384,413, Aug. 1, 1973, abandoned.

[30] Foreign Application Priority Data

Aug. 18, 1972 Czechoslovakia ................... 5742-72

[51] Int. Cl.² .......................... C08F 8/42; C08F 30/04
[52] U.S. Cl. ........................................ 526/16; 195/63; 195/68; 260/8; 260/112 R; 526/48.1; 526/240
[58] Field of Search .......................... 526/240, 16, 48; 260/47 UP, 431

[56] References Cited

U.S. PATENT DOCUMENTS

| 2,137,236 | 11/1938 | Christiansen | 260/431 |
| 2,618,645 | 11/1952 | Bowles | 260/434 |
| 3,367,898 | 3/1968 | Cadmus | 260/29.6 |

FOREIGN PATENT DOCUMENTS

| 7,244,354 | 11/1972 | Japan | 526/240 |

*Primary Examiner*—Christopher A. Henderson

[57] ABSTRACT

There is disclosed a composition of matter comprising a polymer containing aromatically bound mercuric ions having the formula

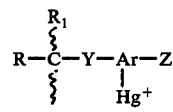

I wherein R is H or $CH_3$, Y is $- CO(OCH_2.CH_2)_x - O -$, wherein $x = 0-20$, or $- CONH -$, Ar is a bifunctional aromatic group, $Z = H$ or $NH - R^2$ wherein $R^2$ is acyl, carboxy $C -$ to $-$ alkyl or a sulfonyl group, and $R^1$ is the chain of homopolymer of the formula

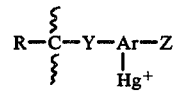

II or the chain of a copolymer selected from the group consisting of methacrylic or acrylic esters of polyfunctional alcohols, methacrylamides or acrylamides, monomers containing one or more acrylic or methacrylic acid groups and monomers of the acrylic or methacrylic series, method of preparing such polymers, carriers produced on the basis of such polymers and method of extracting sulfur-containing compounds from mixtures containing the same utilizing the polymers of the invention.

6 Claims, No Drawings

MERCURATED POLYMERS, METHOD FOR THEIR PREPARATION AND POLYMERS PRODUCED THEREFROM

This is a continuation-in-part of copending application Ser. No. 384,413, filed Aug. 1, 1973, now abandoned, the entire disclosure of which is incorporated herein as if it were fully set forth.

This invention relates to mercurated polymers, methods of their preparation and use and also to the products made from the mercurated polymers.

More particularly, the invention relates to a new class of homo- and copolymers which contain mercuric ions aromatically bound therein. The products produced in accordance with this invention find utility as carriers in biopolymer applications, i.e., as carrier gels for removing sulfur-containing groups from mixtures, in tracing studies, as carriers for biologically active substances and the like. They are especially useful as agents for binding biopolymers.

It is known that in addition to other functional groups able to bind biopolymers characterized by the so-called "proteic character", through covalent bonding, aromatically bound atoms of bivalent mercury may be introduced into synthetic polymers which then are able to bind sulfhydryl groups covalently by reaction thereof with a cystein unit of bioprotein. A polymer carrier of this kind has been prepared for instance, from polystyrene by the direct mercuration thereof with mercuric perchlorate (L. H. Kent, J. H. R. Slade: *Biochem. J.* 77,12 (1960). The hydrophobic character of the polystyrene skeleton of this carrier is, however, not suitable for binding hydrophilic molecules. This, therefore, has prompted a study of the transformations of some natural hydrophilic polymers. As a rule, however, these transformations are effected only by very intricate polymer analogous syntheses which require that several steps be carried out before derivatives containing bound aromatic mercury groups are formed. Thus, for example, P. Quatrecasas (*J. Biol. Chem.* 245, 3061 (1970) introduced a derivative containing a certain amount of covalently bound aryl mercury groups into the agarose gel Sepharose by successive reactions with cyanogen bromide, an aliphatic diamine and p-chloromercurybenzoic acid. The procedure is, however, rather complicated and is associated with the disadvantages typical of polymer analogous reactions, i.e. the intermediates and the product are difficult to define and therefore to separate.

It is accordingly an object of the instant invention to provide for a new class of polymers containing aromatically bound mercuric ions, methods for their preparation and use and also to provide novel articles therefrom.

It is another object of the ivention to avoid one or more drawbacks of the prior art.

These and other objects will become more apparent from the more detailed description and claims which follow.

Broadly speaking the instant invention includes the provisions of a polymer having the formula

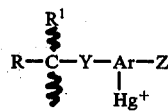

wherein R is H or $CH_3$, Y is $-CO(OCH_2.CH_2)_x-O-$, wherein $x = 0-20$ or $-CONH-$, Ar is a bifunctional aromatic group selected from the group consisting of phenylene, naphthylene, tolylene, xylylene and biphenylene each of which has two free bonds; $Z = H$ or $NH-R^2$, wherein $R^2$ is acyl, carboxy, C to alkyl or a sulfonyl group and $R^1$ is the chain of homopolymer of the formula

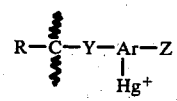

or the chain of a copolymer selected from the group consisting of methacrylic and acrylic esters of polyfunctional alcohols, which may be saturated, unsaturated, aromatic or aliphatic, straight or branched chain, substituted or unsubstituted. As examples of these compounds there may be mentioned methacrylic and acrylic esters of the dilower alkyleneglycols, (i.e., $C_{1-6}$), diethylene glycol, dipropylene glycol and the like; methacrylamides or acrylamides, monomers containing one or more acrylic or methacrylic acid residues in their molecule, such as acrylic acid, methacrylic acid, methylacrylate, methyl methacrylate and the like; and monomers of the acrylic and methacrylic series such as ethylene dimethacrylate, ethylene diacrylate, and the like.

It is to be understood that the above listing is merely illustrative and by no means exhaustive or limiting of the range of operative groups.

The respective ratios of the groups one to the other is substantially non-critical, with the provision that the polymeric product precursor absent the mercury ion conform as indicated above. Where a copolymer is employed as $R^1$, the ratio of its monomeric units may vary over a wide range from 10 to 95%, preferably 40 to 95%. The foregoing copolymers and the homopolymers referred to above may be prepared by procedures known in the art, there being no need for a detailed description of such known procedures herein.

According to the invention, the polymers containing aromatically bound mercury ions and having a broad spectrum of hydrophility and variable macromolecular structure can be obtained in a simple manner by the homo- or copolymerization of a monomer selected from the group consisting of acrylanilide, methacrylanilide, and monomers of the formula

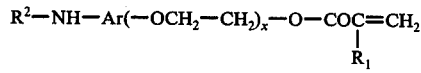

wherein Ar, $x$ and $R_1$ are as above defined and $R^2$ is acyl, carboxyalkyl or sulfonyl. This may be accomplished, as aforesaid, in accordance with known procedures.

The polymer prepared is then treated with a mercuric salt, such a mercuric acetate or perchlorate, nitrate sulphate, chloride and the like. The treatment is carried out at temperatures of about 0° to 100° C, preferably 10° to 30° C. The treatment is advantageously carried out in an aqueous medium, and preferably in water.

In a most preferred embodiment the aromatic nucleus is advantageously activated by an amide group for hydrogen substitution by a mercuric cation in the para position, so that the mercuration proceeds smoothly even at ambient temperature using dilute mercuric salt solutions. The degree of concentration is substantially non-critical and may vary from 0.1 to 50%, preferably 1 to 10%. Aminophenyl esters of acrylic and methacrylic acids require a moderately elevated temperature for this reaction.

All monomers which are able to copolymerize with acrylanilide or methacrylanilide or with acetaminophenyl acrylate or methacrylate are suitable for use in the preparation of the copolymers of the invention.

The hydrophilic monomers of the methacrylic series, such as, acrylic acid, methacrylic acid, methylmethacrylate or methylacrylate, i.e. the monomers having a residue linked by an ester bond and which contain at least one hydroxy or amino group, are especially advantageous for use in the above synthesis.

Most important from the standpoint of hydrolytic stability, a condition for versatile application of the polymer as a carrier, are copolymers of methacrylanilide with methacrylic hydrophilic monomers. Acrylic analogs of these polymers have a lower stability in strongly alkaline or strongly acid medium. Steric hindrance, caused by substituted or free amino group adjacent the mercury atom on the aromatic ring may hinder the application of the mercurated aminophenyl esters.

Copolymers having a three-dimensional network structure, especially those prepared by heterogeneous suspension polymerization find an important application in binding bio-polymers. It is herein possible to start from the known procedures used for hydrophilic monomers and to prepare polymers in the form of defined globular particles having a permanent macroporous structure, which polymers are noteworthy for their large inner surface, outstanding mechanical properties and adequate swelling capacity in a suitable medium. They are described in Czechoslovak Patent Application PV 7050-69, corresponding to U.S. Ser. No. 359,185, filed May 10, 1973, and to Canadian Pat. No. 934,496 and Application PV 7919-70, corresponding to U.S. Ser. No. 281,288, filed August 17, 1972, and to Canadian Patent No. 936,997. If the formulation used for the preparation of these materials is modified only so that the necessary amount of the mercuratable derivative of methacrylic or acrylic acid is added to neutral hydrophilic monomers, gels of macroporous structure can be obtained which may be smoothly converted to high capacity protein carriers by treatment thereof with mercuric salts. Naturally, these gels react even with low-molecular-weight organic compounds having sulfhydryl, sulfide or polysulfide groups and the mercurated gelts may therefore be advantageously used for removing such compounds from mixtures containing same.

In order to prepare insoluble carriers of this type it is not necessary to form the three-dimensional polymers by a crosslinking reaction. Mercuration can be performed either before or after the crosslinking procedure.

In many instances non-crosslinked copolymers of unsaturated aromatic amides or aminophenyl or aminoaphthyl esters of acrylic or methacrylic acid can also be used when their hydrophilic character is insufficient for their dissolution in an aqueous medium under physiological conditions. Such a polymer is formed, for example, by copolymerization of a small portion of methacrylanilide with 2-hydroxyethyl methacrylate. The polymer after mercuration is soluble in alcohol, and only swells in water without any dissolution thereof taking place. Therefore it can be applied as a material for formation of a thin coherent coating which is able to fix molecules containing —SH groups from aqueous solutions.

The invention is further illustrated in the following Examples. The Examples are not to be read as in any way limiting the scope of the invention. All parts, proportions and ratios therein as well as in the appended claims are by weight unless otherwise indicated.

EXAMPLE 1

A mixture consisting of 16 weight parts of methacrylanilide, 33 wt. parts of 2-hydroxyethyl methacrylate, 33 wt. parts of ethylene dimethacrylate, 98 wt. parts of cyclohexanol, 10 wt. parts of laurylalcohol and 0.8 wt. part of 2,2-azobisisobutyronitrile is stirred and heated to 70° C in 600 parts of water containing 6 wt. parts of poly-(vinylpyrrolidone) as a suspension stabilizer. The suspension which is formed after 12 hours is cooled filtered and washed with a ten-fold volume of water and three-fold volume of methanol. The particles are again stirred into a twofold volume of water; 35 wt. parts of mercuric acetate and 3 parts of acetic acid in 100 parts of water are added and the resultant mixture is heated to 50° C for 2 hours. The resulting mercurated product is washed with water on a sintered-glass filter until the reaction of the bivalent mercury ceases and is then dried and analyzed for mercury content.

EXAMPLE 2

A mixture consisting of 10 weight parts of acrylanilide, 83 wt. parts of acrylamide, 7 wt. parts of methylene-bisacryl-amide, and 1 wt. part of potassium peroxodisulfate is allowed to react in 120 parts of water for 8 hours at 60° C between two glass plates separated by a spacer formed of a silicon rubber foil. The thusly obtained membrane is thoroughly washed with water and then mercurated as in Example 1.

EXAMPLE 3

A mixture consisting of 9.8 weight parts of acetaminophenoxyethyl methacrylate, 40 wt. parts of 2-hydroxyethyl methacrylate, 32 wt. parts of ethylene dimethacrylate, 99 wt. parts of dibutylether, 10 wt. parts of laurylalcohol and 1 wt. part of 2,2-azobisisobutyronitrile is mixed with 600 wt. parts of water containing dissolved therein 6 wt. parts of poly(-vinyl-pyrrolidone) at 70° C, for 12 hours. The suspension thus formed is washed with methanol and water as in Example 1, and filtered. The wet particles are stirred with 200 wt. parts of water which contains dissolved 10 wt. parts of sodium hydroxide and then heated to 100° C for 3 hours. After the reaction is complete, the suspension is cooled and washed with water until the alkaline reaction ceases and is again filtered. Mercuration of the gel which contains free amino groups is carried out in 200 parts of water containing 20 wt. parts of sodium acetate and 2 wt. parts of acetic acid at a temperature of 100° C for 3 hours. After washing until the reaction of the mercuric ion ceases, the product is dried and analyzed for mercury content.

EXAMPLE 4

A copolymer is prepared as in Example 3 and mercurated in 200 parts of water containing 20 wt. parts of mercuric acetate, as in the preceding Example, however, without previous hydrolysis of acetamide group on the aromatic ring.

EXAMPLE 5

Diethylene glycol monomethacrylate (35 weight parts), 2.5 wt. parts of methacrylanilide and 2 wt. parts of 2,2-azobisisobutyronitrile are mixed into 150 wt. parts of 96% ethanol and refluxed for 3 hours. The solution is then cooled, filtered and 100 wt. parts of water are added and 100 wt. parts of an ethanol-water mixture is distilled off. Then 10 wt. parts of mercuric acetate in 100 parts of water is added to the mixture and heated to 100° C for 2 hours. The polymer solution thus formed is freed from salts on a column filled with "Sephadex G 10," evaporated to dryness and the polymer analyzed.

We claim:

1. A copolymer containing aromatically bound mercuric ions having the formula

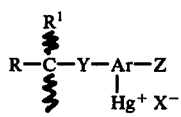

wherein R is H or $CH_3$, Y is $-CO(OCH_2.CH_2)_x-O-$ wherein $x = 0-20$ or $-CONH-$, X is an anion, Ar is a bifunctional aromatic group, Z=H or $NH-R^2$ wherein $R^2$ is acetyl or a carboxy $C_1$ to $C_6$ alkyl group and $R^1$ is the chain of a copolymer formed from the group consisting of methacrylic or acrylic esters of diethylene glycol or dipropylene glycol, methacrylamides or acrylamides, acrylic acid, methacrylic acid, methyl acrylate methyl methacrylate or ethylene dimethacrylate or ethylene diacrylate.

2. A copolymer as defined in claim 1, wherein Y is $-CO(OCH_2.CH_2)_x-O-$

3. A copolymer as defined in claim 2 wherein $-Ar-$ is selected from the group consisting of phenylene, naphthylene, tolylene, xylylene, and biphenylene.

4. A copolymer as defined in claim 1 wherein the ratio of the monomers in said copolymer is about 10 to 95%.

5. A copolymer according to claim 3 wherein X is selected from the group consisting of acetate, perchlorate, nitrate, sulphate and chloride ions.

6. A copolymer as defined in claim 2 wherein acrylanilide or methacrylanilide is employed.

* * * * *